United States Patent [19]

Valade

[11] 4,126,086

[45] Nov. 21, 1978

[54] FORK FOR BARBECUING AND OPEN FIRE COOKING

[75] Inventor: Edmond J. Valade, Fallon, Nev.

[73] Assignee: Win, Inc., Carson City, Nev.

[21] Appl. No.: 856,160

[22] Filed: Nov. 30, 1977

[51] Int. Cl.$^2$ .......................................... A47J 37/04
[52] U.S. Cl. .................................. 99/419; 99/421 A
[58] Field of Search ............ 99/421 R, 421 A, 421 H, 99/421 HH, 419; 294/61

[56] References Cited

U.S. PATENT DOCUMENTS

| | | | |
|---|---|---|---|
| 1,755,646 | 4/1930 | Halstead | 99/419 |
| 1,801,084 | 4/1931 | Huie | 294/61 |
| 3,742,840 | 7/1973 | Cogswell | 99/421 A |
| 3,745,910 | 7/1973 | Delamater | 99/419 |

*Primary Examiner*—Edward J. McCarthy
*Attorney, Agent, or Firm*—Clarence A. O'Brien; Harvey B. Jacobson

[57] ABSTRACT

A short generally cylindrical base is provided and an elongated shank has one end supported from and projects endwise outwardly from one end of the base. A follower is mounted on the shank for adjustable positioning therealong between a retracted position closely adjacent the base and an extended position remote from the base. A pair of elongated generally parallel tines are supported from the follower, on opposite sides of the shank, and generally parallel the shank with the tines projecting endwise outwardly from the follower in the same direction in which the shank projects from the base. A tubular combined handle and cover is provided and is closed at a first end thereof and the second end thereof and the base include coacting bayonet connection structure for supporting the cover from the base in selected end-to-end reversed positions. In a first position of the handle and cover, the latter defines a handle projecting endwise outwardly from the base in a direction opposite to the direction which the shank extends. In the second position of the handle and cover, the latter is telescoped over the shank and the tines, when the follower is in the retracted position, and completely encloses the shank and tines.

9 Claims, 5 Drawing Figures

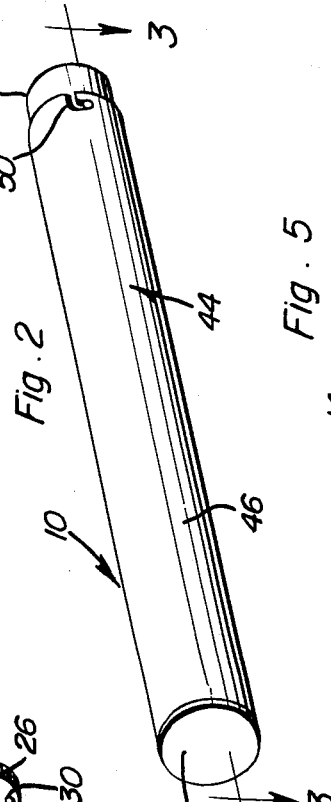
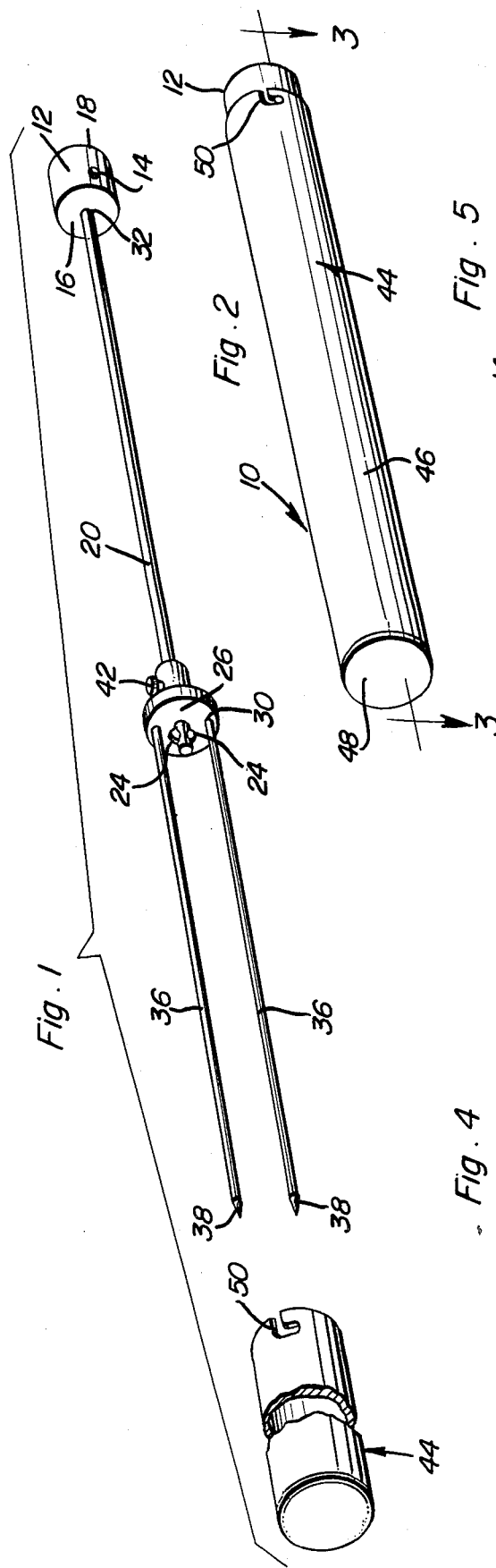
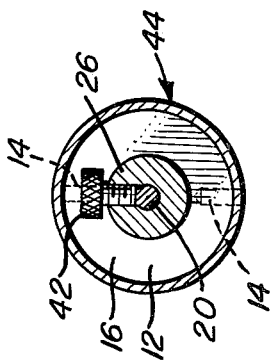
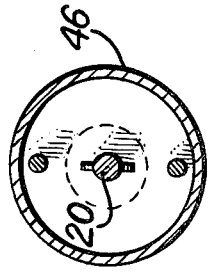
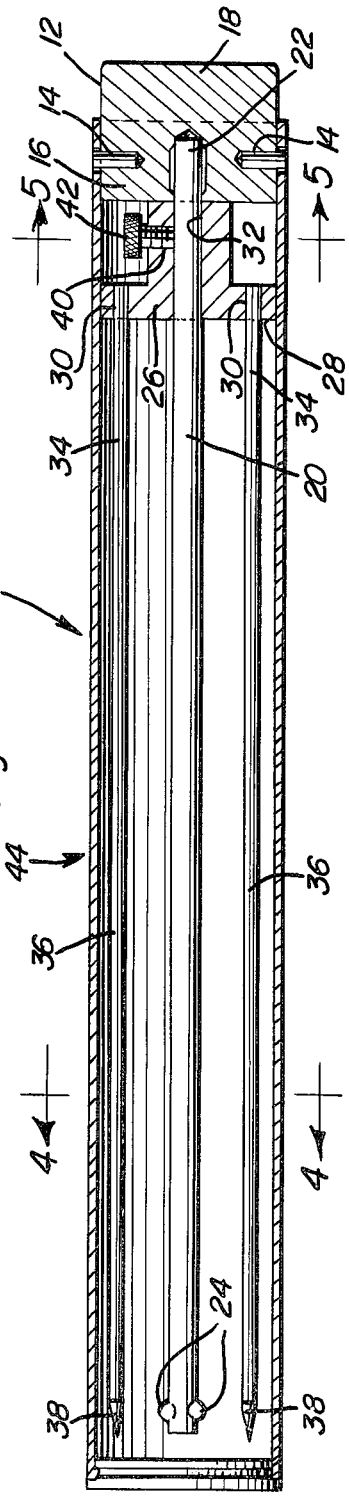

FORK FOR BARBECUING AND OPEN FIRE COOKING

BACKGROUND OF THE INVENTION

Various forms of collapsible food handling implements have been heretofore provided. In addition, some of these collapsible food handling implements have been specifically designed for use in barbecuing food.

However, most collapsible implements, such as collapsible forks designed for use in barbecuing, are not provided with means whereby the free ends of the tines may be fully covered when the implements are not in use. In addition, many of these previously known forms of collapsible implements are constructed of two relatively slidable sections whereby they may be extended to only slightly less than their length when fully collapsed.

Accordingly, a need exists for a collapsible barbecuing fork including structure whereby the tines thereof may be fully encased when not in use and also whereby the barbecuing fork may be extended to a length considerably greater than twice its length when fully collapsed.

Examples of previously known forms of collapsible utensils including some of the general structural and operational features of the instant invention are disclosed in U.S. Pat. Nos. 1,768,425, 2,864,163, 2,974,993, 3,266,144 and 3,742,840.

BRIEF DESCRIPTION OF THE INVENTION

The implement of the instant invention is constructed in the form of a barbecuing fork and may be extended from a collapsed position of a given length to an extended length of almost three times the length of the barbecuing fork when it is in a collapsed position. In addition, the barbecuing fork is further constructed in a manner whereby the tines thereof are fully enclosed when the fork is in its fully collapsed position.

The main object of this invention is to provide a barbecuing fork which may be extended to a length approaching three times the length of the fork when it is a collapsed position.

Another object of this invention is to provide a fork of the collapsible type and constructed in a manner whereby the tines thereof are fully enclosed when the fork is in a fully collapsed position.

Still another object of this invention is to provide a barbecuing fork which may be extended varied amounts when full extension of the fork is not needed.

Yet another object of this invention is to provide an extensible barbecuing fork including structural features which result in an extremely sturdy construction both when the fork is fully collapsed and when the fork is fully extended.

A final object of this invention to be specifically enumerated herein is to provide a barbecuing fork in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the barbecue fork in an extended position and with the combined handle and cover illustrated in exploded position and with parts thereof being broken away;

FIG. 2 is a perspective view of the barbecuing fork in the fully collapsed position and with the handle and cover in position defining a cover for the support shank and tines of the fork;

FIG. 3 is an enlarged, horizontal, sectional view taken substantially upon the plane indicated by the section line 3—3 of FIG. 2;

FIG. 4 is a vertical, sectional view, taken substantially upon the plane indicated by the section line 4—4 of FIG. 3; and, FIG. 5 is a vertical, sectional view, taken substantially upon the plane indicated by the section line 5—5 of FIG. 3.

DETAILED DESCRIPTION OF THE INVENTION

Referring now more specifically to the drawings, the numeral 10 generally designates the collapsible and self-storing food handling implement of the instant invention. The implement 10 includes a cylindrical base 12 which is axially short and has a pair of diametrically opposite radially outwardly projecting pins 14 supported from one end portion 16 thereof. The other end portion 18 of the base 12 includes a substantially smooth cylindrical outer surface.

The implement 10 further includes an elongated cylindrical support shank or rod 20 having a first end 22 thereof centrally anchored within and projecting endwise outwardly from the end portion 16 of the base 12. The free end of the shank or rod 20 includes circumferentially spaced radially outwardly projecting abutments 24 and a sleeve 26 is slidably mounted on the shank or rod 20 between the abutments 24 and the end portion 16 of the base 12. The sleeve 26 includes a circumferentially extending and radially outwardly projecting flange 28 having a pair of bores 30 formed therethrough on opposite sides of the central bore 32 formed through the sleeve 26 through which the shank or rod 20 is received. The bores 30 parallel the bore 32 and corresponding base ends 34 of a pair of tines 36 are secured in the bores 30. The tines 36 parallel the shank or rod 20 on opposite sides thereof and terminate in pointed ends 38 remote from the base 12.

When the sleeve 26 is fully retracted along the shank or rod 20 toward and in abutting engagement with the end portion 16 of the base 12, the pointed ends 38 of the tines 36 are disposed substantially the same distance from the base 12 as the free end of the shank or rod 20 from which the abutments 24 are supported. Further, the sleeve 26 includes a threaded radial bore 40 in which a set screw 42 is threadedly engaged and the set screw 42 may be tightened in the bore 40 into engagement with the shank or rod 20 in order to maintain the sleeve 26 in adjusted position along the shank or rod 20.

The implement 10 further includes a combined handle and cover referred to in general by the reference numeral 44. The combined handle and cover 44 includes a tubular body 46 closed at one end by means of a removable end wall 48. The end of the body 46 remote from the end wall 48 has a pair of L-shaped slots 50 formed therein opening endwise outwardly through the corresponding end of the body 46 and the outer ends of the pins 14 and the slots 50 define coacting bayonet securement structure whereby the combined handle and cover 44 may be releasably secured in position telescoped completely over the tines 36 and the shank or rod 20 in the manner illustrated in FIG. 3 when the sleeve 26 is fully retracted with the outer ends of the pins 14 seated in the slots 50. On the other hand, when the combined handle and cover 44 is removed from the position thereof illustrated in FIG. 3, the set screw 42 may be loosened and the sleeve 26 may be shifted along the shank or rod 20 into abutting engagement with the abutments 24 in order to extend the tines 36. Thereafter, the set screw 42 may be tightened and the combined handle and cover 44 may be reversed in end-to-end position and engaged over the end portion 18 of the body 12 with the pins 14 again seated in the slots 50. In this position, the combined handle and cover 44 defines an extension handle and the entire implement 10 is of a length approaching three times the length of the implement 10 illustrated in FIG. 3. Of course, it is not necessary that the sleeve 26 be fully extended into abutting engagement with the abutments 24. If penetration of the tines 36 into the meat being cooked is to be limited, the sleeve 26 may be only slightly extended and abutting engagement of the free end of the shank or rod 20 with the meat being cooked will limit penetration of the pointed ends 38 of the tines 36 in the meat. In addition, if it is desired, the abutments 24 could be shifted slightly to the right from the positions thereof illustrated in FIG. 3 and the end portion of the shank or rod 20 projecting beyond the repositioned abutments could be sharpended in the same manner in which the tines 36 are sharpended as at 38 and the implement 10 could be used with the handle and cover 44 repositioned from the cover defining position thereof illustrated in FIG. 3 to the exended handle defining position and with the sleeve 26 fully retracted in the position thereof illustrated in FIG. 3 whereby three tines would then be presented for engaging the meat being cooked.

The shank or rod 20 and the tines 36 will preferably be constructed of metal. Further, the sleeve 26 will preferably be constructed of metal, but the body 12 and combined handle and cover 44 may be constructed of other materials, such as wood and plastic, if desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is new is as follows:

1. A collapsible and self-storing food handling implement, said implement including a base, an elongated shank supported from and projecting outwardly from one side of said base, a follower mounted on said shank for adjustable positioning therealong between a retracted position closely adjacent said base and an extended position closely adjacent the outer end of said shank remote from said base, and an elongated implement member supported at one end from said follower and extending outwardly therefrom in a direction paralleling the direction in which said shank projects from said base, the free end of said implement member remote from said follower defining a food engaging implement portion, and an elongated tubular handle removably supported from said base and projecting therefrom in a direction opposite to said shank, said tubular handle being removable from said base and fully telescopingly engageable over said shank and implement member when said follower is in said retracted position, and removably engageable with said base in position extending therefrom in the same direction in which said shank projects.

2. The combination of claim 1 wherein said shank comprises a cylindrical member and said follower comprises a sleeve slidable on said shank.

3. The combination of claim 2 wherein said sleeve includes set screw means engageable with said shank for retaining said sleeve in adjusted positions on said shank.

4. The combination of claim 3 wherein said implement member comprises a pair of generally parallel tines independently supported from said sleeve and disposed on opposite sides of said shank.

5. The combination of claim 1 wherein one end of said tubular handle and said base include coacting means removably supporting said handle from said base in both the handle and implement member enclosing positions thereof.

6. The combination of claim 5 wherein the other end of said tubular handle is closed.

7. The combination of claim 6 wherein said shank comprises a cylindrical member and said follower comprises a sleeve slidable on said shank.

8. The combination of claim 7 wherein said sleeve includes set screw means engageable with said shank for retaining said sleeve in adjusted positions on said shank.

9. The combination of claims 8 wherein said implement member comprises a pair of generally parallel tines independently supported from said sleeve and disposed on opposite sies of said shank.

* * * * *